United States Patent [19]

Bailey

[11] Patent Number: 4,894,103
[45] Date of Patent: Jan. 16, 1990

[54] ROBOT FOR TIRE BUILDING MACHINE AND METHOD OF OPERATION

[75] Inventor: David W. Bailey, Waterloo, Canada

[73] Assignee: The Uniroyal Goodrich Tire Company, Akron, Ohio

[21] Appl. No.: 199,080

[22] Filed: May 26, 1988

[51] Int. Cl.$^4$ .............................................. B29D 30/20
[52] U.S. Cl. .................................... 156/111; 156/396; 414/910; 901/37
[58] Field of Search .................... 156/111, 296, 126; 425/38; 901/1, 16, 15, 31, 37, 39, 30; 414/730, 910

[56] References Cited

U.S. PATENT DOCUMENTS

| | | | |
|---|---|---|---|
| Re. 31,294 | 6/1983 | Marosan | 156/396 |
| 2,706,658 | 4/1955 | Jewell | 414/910 X |
| 3,367,299 | 2/1968 | Sayre, Jr. | 901/37 X |
| 4,039,365 | 8/1977 | Takasuga et al. | 156/126 X |
| 4,230,517 | 10/1980 | Enders . | |
| 4,239,565 | 12/1980 | Henley et al. . | |
| 4,369,086 | 1/1983 | Nakahama et al. | 156/403 |
| 4,391,769 | 7/1983 | Ichikawa et al. . | |
| 4,473,427 | 9/1984 | Irie . | |
| 4,584,049 | 4/1986 | Mukae et al. . | |

FOREIGN PATENT DOCUMENTS 0504674 3/1977 U.S.S.R. .............................. 156/396
0766886 10/1980 U.S.S.R. .............................. 156/396

Primary Examiner—Raymond Hoch
Attorney, Agent, or Firm—Michael J. Colitz, Jr.; Alan A. Csontos

[57] ABSTRACT

A robot for transporting a cylindrical tire carcass between various processing locations comprising arms with contoured free ends movable toward each other to thereby grasp the exterior cylindrical surface of a carcass, the free ends also being movable away from each other to thereby grasp the interior cylindrical surface of a green tire; transport means to move the arms between a pick up location, a tire building machine, and an inspection location; and control means adapted to move the arms toward each other at the pick up location to grasp the exterior cylindrical surface of a carcass and to activate the transport means to convey the grasped carcass to the tire building machine, the control means also adapted to move the arm away from each other at the tire building machine to grasp the interior cylindrical surface of a green tire and to activate the transport means to convey the grasped green tire to the inspection location.

6 Claims, 5 Drawing Sheets

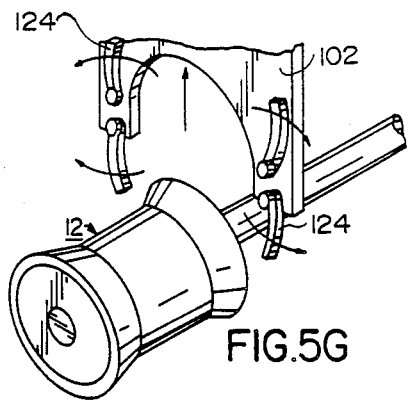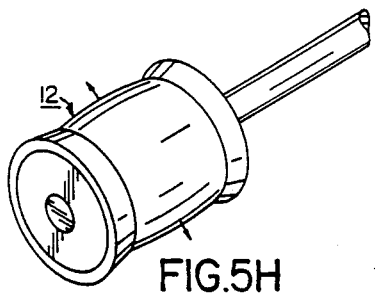

ROBOT FOR TIRE BUILDING MACHINE AND METHOD OF OPERATION

BACKGROUND OF THE INVENTION

1. Field of the Invention

This invention relates to a tire building machine and, more particularly, to a robot for transporting a tire carcass in a second stage tire building machine and its method of use.

2. Description of the Background Art

Pneumatic tires of the bias type are generally built commercially in a "flat band" and subsequently expanded to the toroid shape in a curing mold. While building such tires, the strip material including the tread strips are applied directly over a laminated tire carcass while in a flat band orientation.

Conversely, pneumatic tires of the radial type are generally built commercially by the "toroid" method. This method requires a first stage tire building machine for constructing the carcass in a flat band configuration and a second stage tire building machine for constructing the breaker and tread strips and applying them to the carcass. At the second stage machine, the carcass is supported on a first drum where it is expanded into a toroid shape. The tread and breaker strips are separately built on a second drum and then transferred onto the periphery of the supported carcass to form the green tire ready for vulcanization.

Various approaches to continuous and automatic tire building machines and methods are disclosed in the literature. Note for example, U.S. Pat. Nos. 4,230,517 to Enders; 4,239,565 to Henley; 4,391,769 to Ichikawa; 4,473,427 to Irie and 4,584,049 to Mukae. All of these patents disclose methods or apparatus for transporting carcasses in tire building machinery. Although many such advances are noteworthy to one extent or another, none achieves the objective of a tire building machine which is continuous and automatic, efficient, rapid and economical in its operation.

As illustrated by the great number of prior patent as well as commercial devices, efforts are continuously being made in an attempt to improve tire building machines and methods to render them more effective, rapid and economical. None of these previous efforts, however, provides the benefits attendant with the present invention. Additionally, prior tire building machines do not suggest the present inventive combination of method steps and component elements arranged and configured as disclosed and claimed herein. The present invention achieves its intended purposes, objects and advantages over the prior art devices through a new, useful and unobvious combination of component elements, with the use of minimum number of functioning parts, at a reasonable cost to manufacture, and by employing only readily available materials.

Therefore, it is an object of this invention to provide a robot for transporting a cylindrical tire carcass between various processing locations comprising arms with contoured free ends movable toward each other to thereby grasp the exterior cylindrical surface of a carcass, the free ends also being movable away from each other to thereby grasp the interior cylindrical surface of a green tire; transport means to move the arms between a pick up location, a tire building machine, and an inspection location; and control means adapted to move the arms toward each other at the pick up location to grasp the exterior cylindrical surface of a carcass and to activate the transport means to convey the grasped carcass to the tire building machine, the control means also adapted to move the arms away from each other at the tire building machine to grasp the interior cylindrical surface of a green tire and to activate the transport means to convey the grasped green tire to the inspection location.

It is a further object of the invention to provide a method of transporting a cylindrical tire carcass and a cylindrical green tire between various processing locations comprising providing a robot having arms with contoured free ends movable toward each other t thereby grasp the exterior cylindrical surface of a carcass and movable away from each other to thereby grasp the interior cylindrical surface of a green tire; moving the robot between a pick up location, a tire building machine, and an inspection location; closing the arms by pivotal movement toward each other at the pick up location to grasp the exterior cylindrical surface of a carcass and then transporting the grasped carcass to the tire building machine through the moving of the robot; and opening the arms by pivotal movement away from each other at the tire building machine to grasp the interior cylindrical surface of a green tire and then transporting the grasped green tire to the inspection location by the moving of the robot.

It is a further object of the invention to provide an improve method of transporting a cylindrical tire carcass between various processing locations comprising providing a robot with contoured arms movable toward each other to thereby grasp the exterior cylindrical surface of a carcass and movable away from each other to thereby grasp the interior cylindrical surface of the carcass; moving the robot between a pick up location a second stage tire building machine, and a drop off location; moving the arms toward each other at the pick up location to grasp the exterior of the carcass and transporting the robot to convey the grasped carcass to the second stage tire building machine; and moving the fingers away from each other at the intermediate location to grasp the interior of the carcass and transporting the robot to convey the grasped carcass to the drop off location.

It is yet a further object of this invention to move a tire carcass to and through a second stage tire building machine and to remove the constructed green tire therefrom.

Lastly, it is yet an additional object of the invention to build tires on a second stage tire building machine more efficiently, rapidly and economically.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings.

For the purpose of summarizing the invention, the invention may be incorporated into a robot for transporting a cylindrical tire carcass between various processing locations comprising arms with contoured free ends movable toward each other to thereby grasp the exterior cylindrical surface of a carcass, the free ends also being movable away from each other to thereby grasp the interior cylindrical surface of a green tire; transport means to move the arms between a pick up location, a tire building machine, and an inspection location; and control means adapted to move the arms toward each other at the pick up location to grasp the exterior cylindrical surface of a carcass and to activate the transport means to convey the grasped carcass to the tire building machine, the control means also adapted to move the arms away from each other at the tire building machine to grasp the interior cylindrical surface of a green tire and to activate the transport means to convey the grasped green tire to the inspection location.

The robot includes a plate having a cutout extending between the arms from one edge thereof, the plate also including pivot means on opposite sides of the cutout for movably supporting the arms with respect to each other and with respect to the plate. The pivot means are located on each side of the cutout for supporting two arms on each side of the cutout. The arms are formed with flanges extending away from the plate with interior surfaces contoured to substantially conform with an exterior cylindrical edge of a carcass and with exterior surfaces contoured to substantially conform to the interior cylindrical edge of a green tire. The robot further includes a universal motion-imparting mechanism adjacent to the edge of the plate remote from the cutout for moving the plate. The robot further includes guide blocks and an array of horizontal and vertical rails for guiding the movement of the plate and its arms with respect to the tire building machine.

The invention may also be incorporated into a robot for transporting a cylindrical tire carcass and a cylindrical green tire between various processing locations of a tire building machine comprising arms with contoured free ends movable toward each other to thereby grasp the exterior cylindrical surface of a carcass, the free ends also being movable away from each other to thereby grasp the interior cylindrical surface of a green tire; a plate having a cutout extending between the arms from one edge thereof; pivot means on opposite sides of the cutout for movably supporting the arms with respect to the plate, the arms being formed with flanges extending away from the plate with their interior surfaces contoured to substantially conform with an exterior cylindrical edge of a carcass and with their exterior surfaces contoured to substantially conform to the interior cylindrical edge of a green tire.

The invention may also be incorporated into a method of transporting a cylindrical tire carcass and a cylindrical green tire between various processing locations comprising providing a robot having arms with contoured free ends movable toward each other to thereby grasp the exterior cylindrical surface of a carcass and movable away from each other to thereby grasp the interior cylindrical surface of a green tire; moving the robot between a pick up location, a tire building machine, and an inspection location; closing the arms by pivotal movement toward each other at the pick up location to grasp the exterior cylindrical surface of a carcass and then transporting the grasped carcass to the tire building machine through the moving of the robot; and opening the arms by pivotal movement away from each other at the tire building machine to grasp the interior cylindrical surface of a green tire and then transporting the grasped green tire to the inspection location by the moving of the robot.

In addition, for the purpose of summarizing the invention, the invention may be incorporated into a method of transporting a cylindrical tire carcass between various processing locations comprising providing a robot with contoured arms movable toward each other to thereby grasp the exterior cylindrical surface of a carcass and movable away from each other to thereby grasp the interior cylindrical surface of the carcass; moving the robot between a pick up location a second stage tire building machine, and a drop off location; moving the arms toward each other at the pick up location to grasp the exterior of the carcass and transporting the robot to convey the grasped carcass to the second stage tire building machine; and moving the fingers away from each other at the intermediate location to grasp the interior of the carcass and transporting the robot to convey the grasped carcass to the drop off location.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIGS. 5A–5H are illustrations of the first stage tire carcass and robot showing their movements from the input station to the first station of the tire building machine as shown in FIG. 1.

DETAILED DESCRIPTION OF THE INVENTION

Overview

Figure 1:
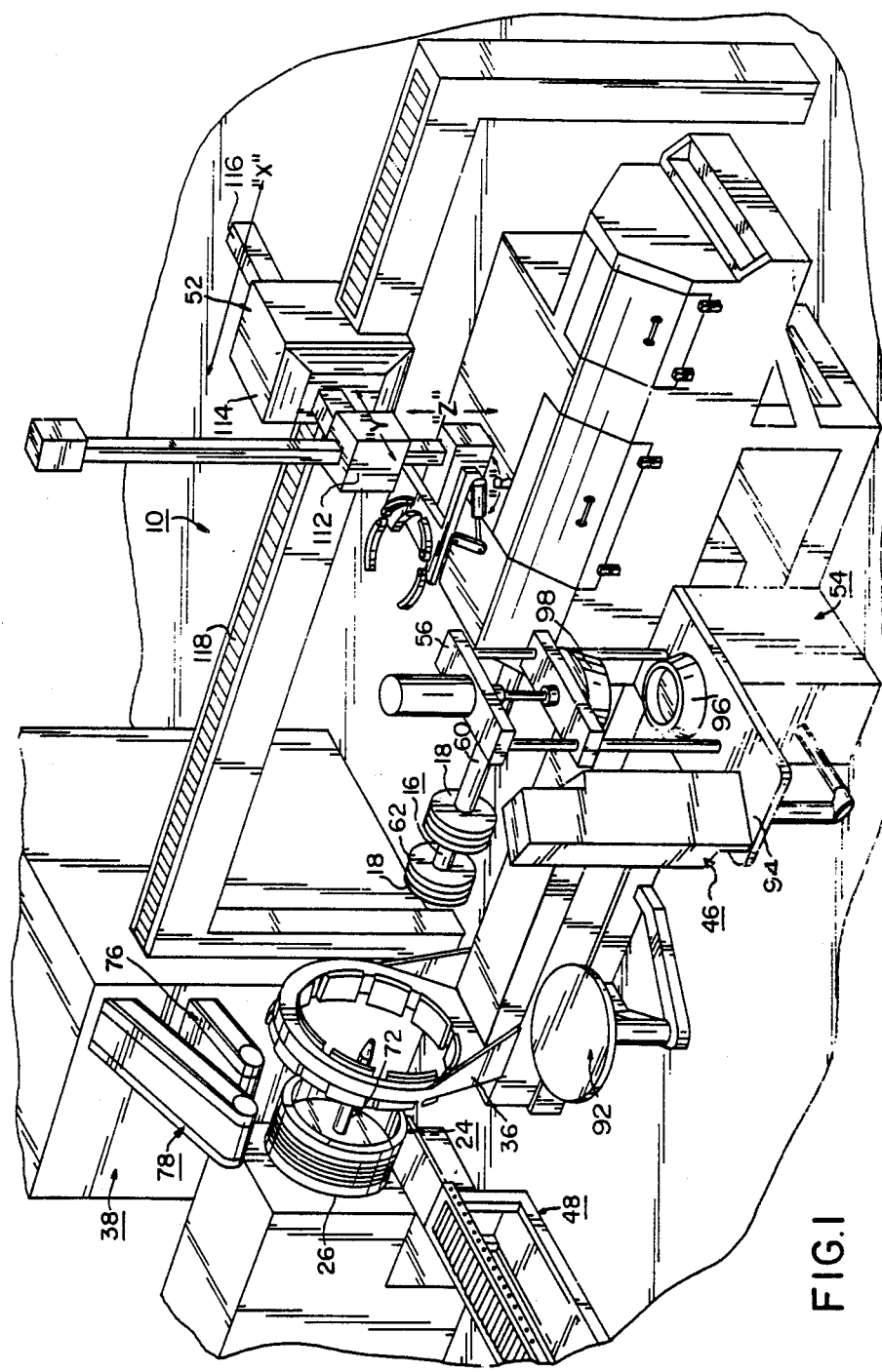
FIG. 1 is a perspective illustration of a second stage tire building machine constructed in accordance with the principles of the present invention.
Figure 2:
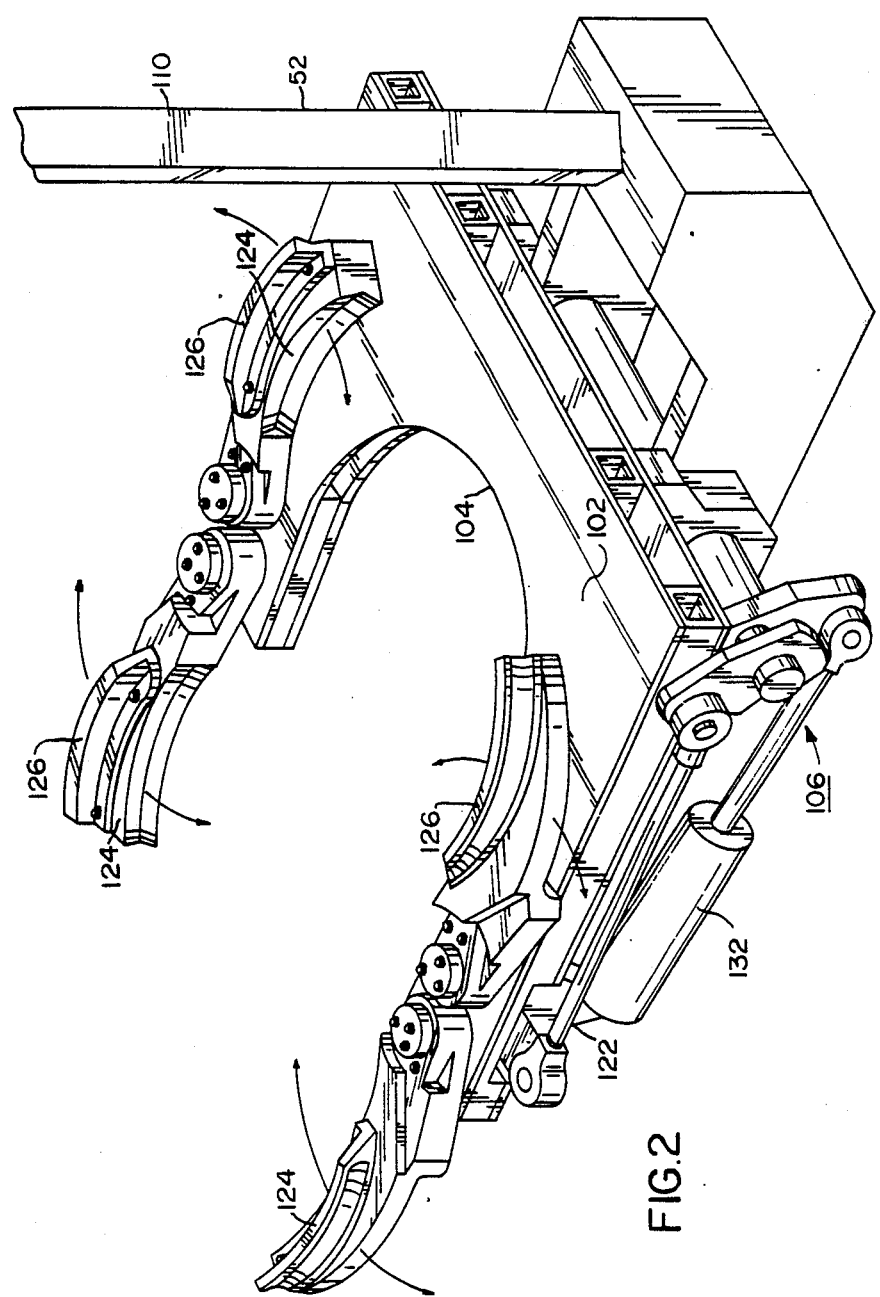
FIG. 2 is an enlarged perspective illustration of the gripping portion of the robot as seen in FIG. 1.
Figure 3A:
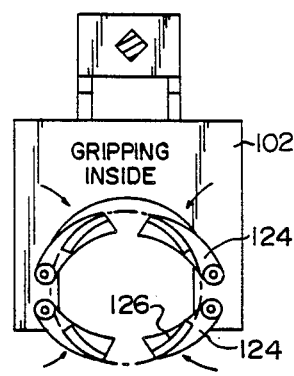
FIGS. 3A and 3B are plan views of the gripping portion of the robot shown in FIG. 2 illustrating the gripping fingers in alternate operational positions.
Figure 3B:
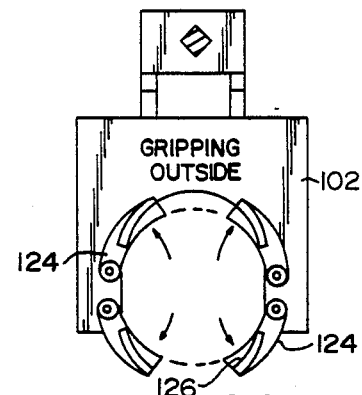
Figure 4A:
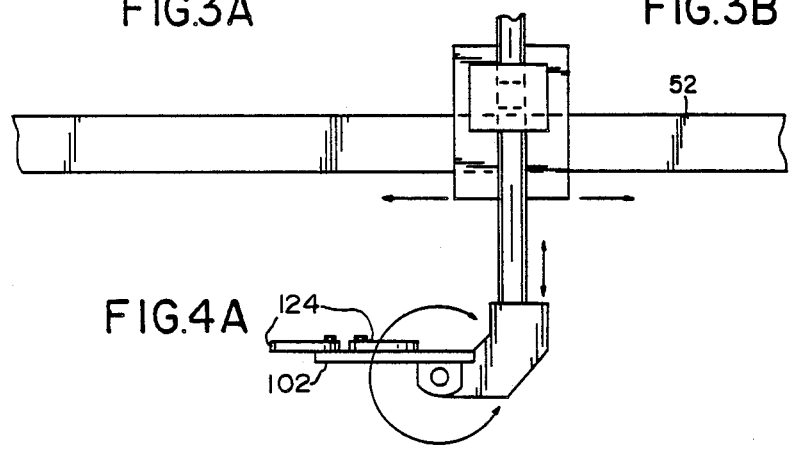
FIGS. 4A and 4B are side elevational and plan views of the gripping portion of the robot as shown in FIGS. 2, 3A and 3B.
Figure 4B:
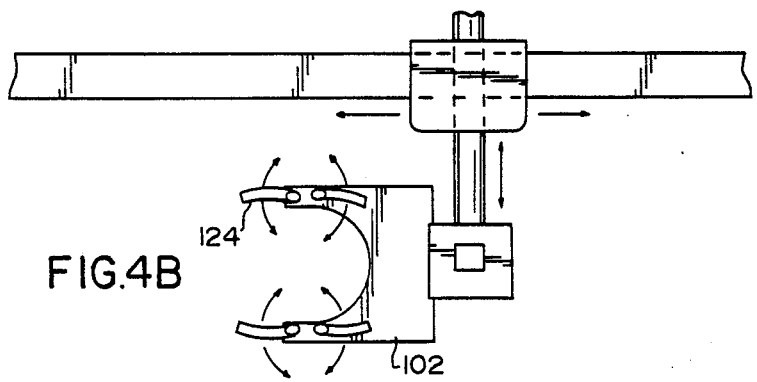

The second stage tire building machine 10 of the present invention is depicted in the attached drawings. It is comprised of a plurality of assemblies, subassemblies and components operable together for its purpose of converting a generally cylindrically shaped carcass 12 into a toroid-shaped green tire 14 ready for vulcanization. The machine includes a first or carcass drum assembly or station 16 formed of spaced flanges 18 adapted to receive and support the carcass 12. It functions to expand the carcass 12 into a toroid shape for the receipt of a breaker and tread cylinder 20 for the formation of the green tire.

The machine also includes a second or breaker drum assembly or station 24 formed of a collapsible drum 26 rotatable about an axis aligned with, but axially offset from, the axis of the flanges 18 of the carcass drum assembly. The breaker drum is adapted to receive strips of breaker material 28 and 30 and a strip 32 of tread material and to position them in a superposed relationship to form the breaker and tread cylinder. The breaker and tread cylinder is then transported axially from the breaker drum assembly 24 to the carcass 12 at the carcass drum assembly 16 by a transport ring 36 which is axially shiftable between the two drum assemblies.

A third assembly is the servicer assembly or station 38 which is adapted to convey breaker material along paths of travel from supply rolls 40 and 42, past cutter and tip aligner subassemblies 44, to the breaker drum 26. The conveying of the breaker material is at an appropriate speed and in an appropriately timed sequence to effect the desired result of a continuous and repeatable breaker tread cylinder. The servicer assembly includes the framing support structures as well as the conveyor belts and control mechanisms 46 for effecting the appropriate conveying of the breaker material to the breaker drum. The control mechanisms include belts, pulleys and sensors to input a controller r determining material position and thus allow for the intended operation and control of the machine. A tread conveyor 48, operable in association with the servicer, functions for feeding precut strips 32 of tread material onto the surface of the superposed strips 28 and 30 of breaker material on the breaker drum 26.

The machine also includes a robot assembly 52 for conveying the tire carcass 14 from a loading station 54 to the carcass drum assembly. The loading station includes a pre-inflator 36 where the carcass 12 is initially placed by an operator after being carried or otherwise transported from a first stage tire building machine, the place of carcass fabrication. The robot assembly 52 is also adapted to convey the carcass with the breaker and tread cylinder stitched thereto, the green tire 14 ready for vulcanization, to a final or inspection station whereat the operator may view and inspect the green tire and then carry or otherwise transport such green tire to the curing press for vulcanization.

Also included within the machine is an operator programmable control assembly 46 for coordinating the operation of the various assemblies, subassemblies and components in their intended continuous and automatic cycle of operation with minimum operator involvement.

Drum Assemblies

The carcass drum assembly 16 includes a cantilevered member 60 with a free outboard end and an inboard end supported by the machine for rotation by suitable drive mechanisms. Adjacent to its outboard end are a pair of carcass-receiving flanges 18 of similar construction, an inboard flange and an outboard flange. Each flange is of a generally conical configuration for receiving the internal edges of a carcass 12. The carcass-receiving surface of each flange is provided with an elastomeric membrane 62 which communicates by internal conduits with a source of air under pressure whereby the membranes may be inflated to sufficiently increase in diameter to form an air-tight seal with a supported carcass. A further source of air under pressure is coupled with the interior of the carcass through a conduit in the member for the inflation of the carcass supported by the flanges. Such air flows are conventional.

The flanges 18 are mounted on the cantilevered member or shaft 60 through a concentric shaft and the sleeve arrangement. The outboard flange supported by the shaft and inboard flange supported by the sleeve are axially shiftable by drive mechanisms toward and away from each other equally and oppositely. Movement toward each other is performed concurrently with the inflation of the carcass in order to convert the cylindrical carcass into a toroid shape. As a result of the construction and arrangement of the components of the carcass drum assembly, the supported carcass is deformed and inflated in order to receive a breaker and tread cylinder 20 brought into an encompassing position by the transfer ring. With the transfer ring 36 and the breaker and tread cylinder encircling the inflated carcass, the carcass is further inflated to contact the interior surface of the breaker and tread cylinder for adhesion therebetween. The transfer ring is expanded to release the breaker and tread cylinder. The transfer ring is then axially displaced toward the breaker drum to an intermediate location for exposing the periphery of the breaker and tread cylinder.

A stitcher 64, located adjacent the flanges 18 and pivoted on arms 66, is then brought into contact with the periphery of the breaker and tread cylinder 20. Its opposed wheels 68 rotate, through the rotation of the carcass and breaker and tread cylinder, and are driven concurrently away from each other to stitch the breaker and tread cylinder onto the carcass, thereby forming the green tire ready for vulcanization in the curing press.

The breaker drum subassembly 24 includes a collapsible drum 26 rotatable about an axis which is coextensive with, but offset from, the axis of the flanges 18 of the carcass drum assembly 16. The breaker drum assembly includes a cantilevered shaft 72 with a free outboard end and an inboard end supported and driven by the machine. Its outboard end supports the collapsible breaker drum 26 which is located at an axially spaced interval from the carcass drum assembly.

A motion imparting linkage arrangement is adapted to radially displace a plurality of segments 74, two opposite segments greater than 90 degrees and the other two segments less than 90 degrees, as shown in the preferred embodiment. The segments function to effectively expand and contract the breaker-supporting surface of the breaker drum. This action will allow a constructed breaker and tread cylinder to be supported by the breaker drum when the segments are expanded or removed therefrom by the transfer ring when the segments are contracted.

The breaker drum 26 is adapted to be rotated through the shaft 72 whereby it will receive and support a first applied breaker strip 28 from the first conveyor 76 of the servicer assembly and a subsequently applied second breaker strip from another or second conveyor 78 of the servicer assembly. The first breaker strip will completely overlie the surface of the expanded breaker drum with no overlap or gap at its opposite ends. The second breaker strip is slightly longer than the first since it will overlie the first breaker strip on the breaker drum, also with no overlap or gap between its opposite ends. The breaker strips, when together on the breaker drum, form the breaker cylinder. The cutting of the breaker strips and their positioning onto the breaker drum is effected without operator involvement in a continuous and automatic cycle of operation.

Overlying the second breaker strip is the tread strip 32, fed to the rotating breaker drum from the side thereof opposite the servicer. In operation and use, the breaker and tread strips are fed into superposed position onto the breaker drum to form the breaker and tread cylinder. The only operator involvement is the placing of the tread strip on its conveyor 48 and the hand stitching of the trailing edge of the tread strip for completion of the breaker and tread cylinder to be attached to the carcass.

The transfer ring subassembly 36 includes a shiftable member 82 with a circular aperture 84 having an internal diameter greater than the external diameter of the breaker and tread cylinder. The aperture has its axis aligned with the axis of the carcass and breaker drum subassemblies for movement therebetween. Its lower end is supported on rails 86 for movement between its opposite end positions.

A plurality of segments 88, eight in the disclosed preferred embodiment with arcuate interior surfaces, are adapted to move radially toward and away from the axis of the ring. Their open positions are radially removed from the axis of the ring, but they are movable radially interiorly to closed positions to grasp the breaker and tread cylinder.

With the breaker and tread cylinder gripped by the transfer ring, the breaker drum is then collapsed to a reduced diameter so that the transfer ring may contact, grasp and then axially shift the breaker and tread cylinder to a position over and encompassing the carcass. The carcass is then expanded to contact the breaker and tread cylinder for adherence therebetween. The transfer ring is then expanded to release the breaker and tread cylinder and then move to a location between the two drum assemblies during the final stitching of the green tire. Thereafter, the transfer ring is moved to encompass the stitched green tire through the contraction of its segments. The exhausting of the air from the green tire and the separation of the flanges releases the green tire from the carcass drum assembly. The transfer ring then moves the green tire to a location between the drum assemblies where it is picked up by the robot. The segments are then expanded and the transfer ring returned to the breaker drum assembly to pick up the next breaker and tread cylinder while the robot conveys the green tire to the inspection station.

Robot Assembly

The robot 52 functions to move the carcass 12, previously constructed at the first stage tire building machine, not shown, from the pre-inflator 56 at the loading station 54, onto the flanges of the carcass drum. It then moves the carcass 12 with a breaker and tread cylinder thereon, the green tire 14, from the transfer ring 36 between the two drum assemblies, to an inspection station 92 for viewing by the operator. The inspection station is simply a table with an upper surface for supporting the green tire with its axis positioned vertically. The loading station 34, however, includes a table 94 having a conically shaped support 96 for retaining a carcass spaced from the table with its axis oriented vertically. Above the carcass is a sealing cone 98 movable into and out of contact with the upper edge of the carcass. An aperture through the center of the cone allows for the introduction of a short burst of air, from a source of compressed air, into the carcass sealed by the cones to return the carcass to its cylindrical orientation in the event that it has been deformed during storage.

The robot 52 includes a flat rectangular plate 102 with an arcuate cutout 104 extending inwardly from the first or remote edge to form a semicircle with a radius slightly larger than the radius of the carcass when unexpanded. The second or near edge is supported by a motion imparting mechanism 106 for essentially universal movement. The motion imparting mechanism is, in turn, mounted to a vertical guide bar 110 for raising and lowering the plate by movement through an actuatable first drive carriage 112 in the Z meridian or vertically. The first drive carriage is mounted on a second drive carriage 114. The second drive carriage is actuatable to move a short horizontal guide bar 116 in the X meridian. The second drive carriage is movable upon a long horizontal guide bar 118 in the Y meridian, also horizontally. The three guide bars and two drive carriages function together from controller signals to impart the necessary three meridian horizontal and vertical movements to the robot plate and its arms in order to effect its intended functions. Signals from the controller also effect the opening and closing of the arms on the robot plate.

Located on the plate on opposite sides of the cutout adjacent to the side edges are pairs of arms 122 pivotally secured to the plate by drive pins for moving the arms 124. The free ends of the arms are formed with curved flanges 126, or gripping surfaces, extending outwardly from the plate. The formed arms are generally movable concurrently between first open or separated positions where the arms are located remote from the cutout and second closed or adjacent positions where the arms are located to overlie the cutout. The flanges have smooth radially interior surfaces whereby they are moved inwardly to grasp the exterior of a carcass from a pre-inflator at the loading station and to move the grasped carcass onto the carcass drum.

The exterior surfaces of the flanges of the arms are shaped to be inserted into an end of the green tire supported by the transfer ring between the carcass and breaker drums. When expanded, the robot grasps the green tire and transports it to an inspection station remote from the machine.

The gripping of the carcass by the arms of the robot occurs at the circumferential edge of the carcass where the bead 130 is located. The bead 130 is an inextensible cord and, as a result, the gripping will not stretch the carcass and will thereby ensure a more reliable gripping and retention of the gripped carcass by the arms.

Figure 5A:
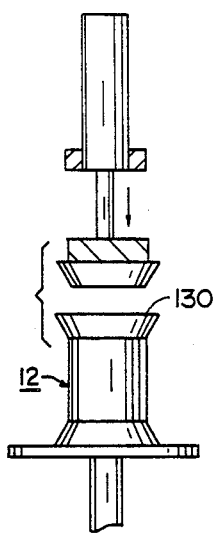
Figure 5B:
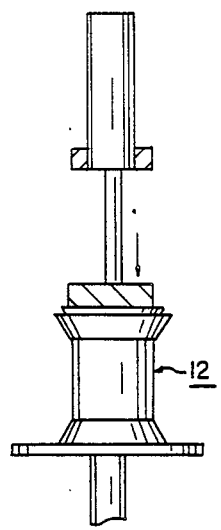
Figure 5C:
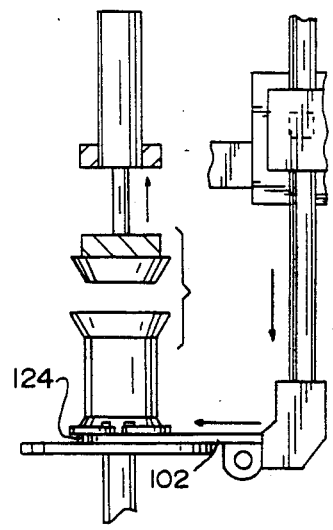
Figures 5D, 5E:
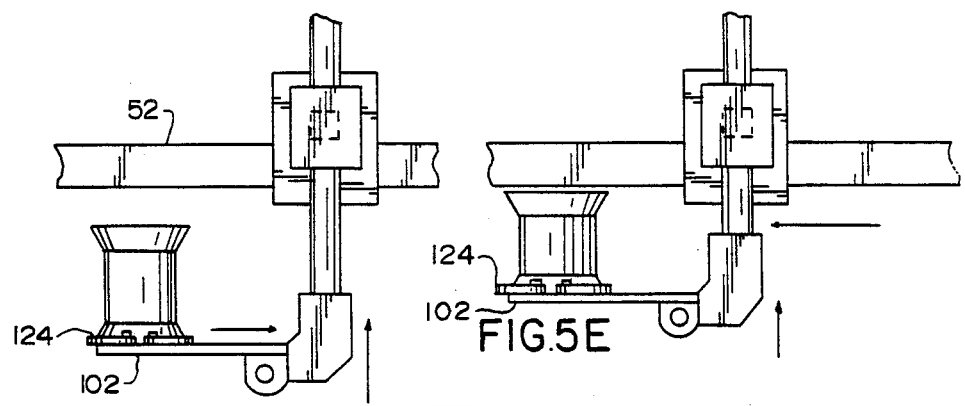
Figure 5F:
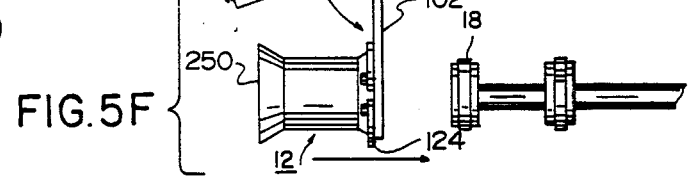

In operation and use, the plate 102 is initially held horizontally adjacent the pre-inflator and moved forward by the first drive carriage 112 with the plate located beneath the lower edge of the carcass. The pre-inflator provides an initial burst of air to the carcass to return the carcass to its essentially cylindrical shape. The retracted arms 124 are then pivoted inwardly toward the lower edge of the carcass for grasping it. The grasped carcass is then moved upwardly a slight extent to clear the lower cone of the pre-inflator. It is then horizontally withdrawn therefrom. The carcass and plate may then be inverted by the universal mechanism by rotary movement in an R meridian about an axis with the carcass depending from the horizontal plate to minimize deformation of the carcass during its movement. The movement is upwardly by the first drive carriage 112 and then horizontally in one or both meridians by the second drive carriage 114 above the carcass drum and the two guide bars. The network of two horizontal and one vertical guide rails define the path of movement of the robot as determined by the controller driving the two drive carriages. Note FIGS. 5A through 5F.

The plate 102 is then held vertically with the carcass supported on a horizontal axis, parallel with, but offset from the axis of the carcass drum. The plate and carcass are then arcuately moved, plate side first, over the outboard flange of the carcass drum until the edges of the carcass overlie the outboard and inboard flanges. After the carcass has been let go, the flanges are pneumatically expanded radially into contact with the interior edges of the carcass for its support whereafter the arms of the robot are expanded and the plate lifted to allow for the inflation of the carcass through the introduction of air to the interior of the carcass concurrent with the axial movement of the flanges toward each other. This continues the carcass assumes a toroid shape. The sealing of the carcass is effected prior to bringing the flanges together.

After the transfer ring 116 has moved a beaker and tread cylinder from the breaker drum 26 to encircle the carcass or the carcass drum, the carcass is further inflated to contact and adhere to the interior surface of the breaker and tread ring. At this point, the transfer ring 36 is expanded and axially shifted away to an intermediate location between the two drum assemblies so that a stitcher may secure the breaker and tread cylinder to the carcass thereby completing the green tire ready for vulcanization. The transfer ring 36 is then moved back to the green tire on the carcass drum whereat it is contracted to support the green tire while the air therein is depressurized. The transfer ring is then axially shifted to a location intermediate the carcass and breaker drums. The robot 52 is then moved with its plate 102 held vertically and its arms totally contracted so that the flanges of the arms are within one end of the green tire, that end facing the carcass drum. At this point the arms 124 are then expanded so that the exterior surfaces of the flanges of the robot grasp the green tire from its interior edge. The robot, with the green tire depending therefrom, is moved to the table 92 at the inspection station whereat the arms are contracted and the green tire deposited on the surface of table. The transfer ring 36 is then axially shifted for grasping the next breaker and tread cylinder in a continuing cycle of operation. When the transfer ring releases the green tire for being transported by the robot 52, the transfer ring 36 then begins moving toward the breaker and tread cylinder 20 while the robot 52 moves to pick up the next carcass 12 at the loading station in a continuing, automatic cycle of operation.

The motors 132 for opening and closing the arms in a predetermined cycle of operation are all controlled automatically from the controller 46 at an operator station. A robot of this type is commercially available as a gantry type robot manufactured and sold by The C & D Machine & Engineering Company of Port Neches, Tex. The movement, sequence and timing of the robot may be modified by the operator.

Controller Assembly and Method

A controller assembly 46 dictates the operational events of the second stage tire building machine and the method of operation as described above including the carcass and breaker drum assemblies 24, the servicer assembly 38, the cutter and tip aligner assembly 44 and the robot assembly 52. The controller 46 is fully programmable by the operator through the control panel to vary the mode of operation of the various assemblies and component subassemblies and elements as may be desired to accommodate the fabrication of green tires of various characteristics from carcasses and breaker and tread strips of various characteristics.

The controller 46 provides the operator with various timed windows of operation such as for bringing the carcass onto the pre-inflator at the input station 94 and for removing the green tire from the inspection or output station. A window of operation is meant to be a predetermined time period in the sequence of operation of the machine during which the operator must perform a particular task or step in the sequence of operations otherwise the machine will cease its next sequential function and stop its further functioning. Another window of operation is provide for placing a tread strip on the tread conveyor. In all other aspects, the controller drives the machine continuously and automatically without operator involvement.

Inputs to the controller assembly 46 as set forth above include the breaker material width sensors between the preliminary and input conveyors, the breaker strip length sensors 28, and the tread strip length sensor. Outputs from the controller assembly, as set forth above, include the drives for the preliminary conveyors and feed rolls, the breaker material conveyors, the tread material conveyor, the cutter and aligner subassembly, the drum assemblies, stitcher and robot.

The method of operation basically involves the fabricating of a green tire 14 from a carcass 12 on a second stage tire building machine including the steps of providing a first inboard station for loading, shaping and stitching a first stage tire carcass, providing an outboard second station 16 axially offset from the first station for assembling a breaker and tread cylinder, feeding breaker strips to the second station, feeding a tread strip to the second station 16 for the completion of the breaker tread and cylinder, transporting the breaker and tread cylinder 20 from the second station 16 onto the periphery of the carcass 12 for the formation of a green tire 14 by a transfer ring 36 and then transporting the green tire 14 to an intermediate location to transport the carcass to the first station 24 and the green tire to a final location by a robot 52, and coordinating the movement of the breaker strip, tread strip, transfer ring and robot by a controller 46 in a continuous and automatic cycle of operation.

The various sensors and control functions act together to synchronize the various component elements, subassemblies and assemblies of the machine. They also allow for the programmability of such functions to provide flexibility through the controller, all precisely determined by the precise measurements initiated with the toothed timing belts and the associated sensors.

Further specifics involved in the method of operation are detailed more completely in the descriptions of the various assemblies, subassemblies and components as described above.

In addition, further associated details of operation and construction are set out in U.S. application Ser. No. 199,081 filed concurrently herewith and assigned to the assignee of the instant application, the subject matter of which is incorporated by reference herein.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and scope of the invention.

Now that the invention has been described; what is claimed is:

1. A method of transporting a cylindrical tire carcass and a cylindrical green tire between various processing locations comprising:
   providing a robot having a pair of pivotally supported arms with contoured free ends movable toward and away from each other, the arms having first interior surfaces of a size and shape to thereby grasp the exterior cylindrical surface of a carcass when the arms are moved toward each other, the arms also having second exterior surfaces of a size and shape to thereby grasp the interior cylindrical surface of a green tire when the arms are moved away from each other;
   moving the robot between a pick up location, a tire building machine, and an inspection location;
   closing the arms by pivotal movement toward each other at the pick up location to grasp the exterior cylindrical surface of a carcass with first surfaces and then transporting the grasped carcass to the tire building machine through the moving of the robot; and
   opening the arms by pivotal movement away from each other at the tire building machine to grasp the interior cylindrical surface of a green tire with second surfaces and then transporting the grasped green tire to the inspection location by the moving of the robot.

2. A robot for transporting a cylindrical tire carcass and cylindrical green tire between various processing locations of a tire building machine comprising:
   arms with contoured free ends pivotable toward each other with first surfaces to thereby grasp the exterior cylindrical surface of a carcass, the free ends also being pivotable away from each other with second surfaces to thereby grasp the interior cylindrical surface of a green tire;
   a plate supporting the arms;
   pivot means on opposite sides of the plate for pivotably supporting the arms with respect to the plate, the arms being formed with flanges extending away from the plate with their interior surfaces contoured to substantially conform with an exterior cylindrical edge of a carcass and with their exterior surfaces contoured to substantially conform to the interior cylindrical edge of a green tire;
   means associated with the plate and arms for pivoting the arms with respect to the plate toward and away from each other; and
   means for moving the plate and arms to transport a carcass and green tire between a pick-up location, a tire building machine and an inspection location.

3. A robot for transporting a cylindrical tire carcass and a cylindrical green tire between various processing locations of a tire building machine comprising:
   arms with contoured free ends movable toward each other with first surfaces to thereby grasp the exterior cylindrical surface of a carcass, the free ends also being movable away from each other with second surfaces to thereby grasp the interior cylindrical surface of a green tire;
   a plate having a cutout extending between the arms from one edge thereof;
   pivot means on opposite sides of the cutout for movably supporting the arms with respect to the plate, the arms being formed with flanges extending away from the plate with their interior surfaces contoured to substantially conform with an exterior cylindrical edge of a carcass and with their exterior cylindrical edge of a carcass and with their exterior surfaces contoured to substantially conform to the interior cylindrical edge of a green tire.

4. A robot for transporting a cylindrical tire carcass and a cylindrical green tire between various processing locations of a tire building machine comprising:
   arms with contoured free ends movable toward each other with first surfaces to thereby grasp the exterior cylindrical surface of a carcass, the free ends also being movable away from each other with second surfaces to thereby grasp the interior cylindrical surface of a green tire;
   a plate having a cutout extending between the arms from on edge thereof, the plate also including pivot means on opposite sides of the cutout for movably supporting the arms with respect to each other and with respect to the plate, the pivot means being located on each side of the cutout for supporting two arms on each side of the cutout, the arms being formed with flanges extending away from the plate with interior surfaces contoured to substantially conform with an exterior cylindrical edge of a carcass and with exterior surfaces contoured to substantially conform to the interior cylindrical edge of a green tire;
   transport means to move the arms between a pick up location, a tire building machine, and an inspection location; and
   control means adapted to move the arms toward each other at the pick up location to grasp the exterior cylindrical surface of a carcass and to activate the transport means to convey the grasped carcass to the tire building machine, the control means also adapted to move the arms away from each other at the tire building machine to grasp the interior cylindrical surface of a green tire and to activate the transport means to convey the grasped green tire to the inspection location.

5. The robot as set forth in claim 4 and further including a universal motion-imparting mechanism adjacent to the edge of the plate remote from the cutout for moving the plate.

6. The robot as set forth in claim 5 and further including guide blocks and an array of horizontal and vertical rails for guiding the movement of the plate and its arms with respect to the tire building machine.

* * * * *

UNITED STATES PATENT AND TRADEMARK OFFICE
CERTIFICATE OF CORRECTION

PATENT NO. : 4,894,103

DATED : January 16, 1990

INVENTOR(S) : David W. Bailey

It is certified that error appears in the above-identified patent and that said Letters Patent is hereby corrected as shown below:

Column 12, Claim 3, Line 21 delete -- exterior cylindrical edge of a carcass and with their --

Column 12, line 34 "on" should read -- one --

Signed and Sealed this

Twenty-first Day of May, 1991

Attest:

HARRY F. MANBECK, JR.

*Attesting Officer*    *Commissioner of Patents and Trademarks*